United States Patent
Donaldson (10) Patent No.: US 9,118,488 B2
(45) Date of Patent: Aug. 25, 2015

(54) SYSTEM AND METHOD FOR CONTROLLING ACCESS TO NETWORK SERVICES USING BIOMETRIC AUTHENTICATION

(75) Inventor: Thomas A. Donaldson, London (GB)

(73) Assignee: AliphCom, San Francisco, CA (US)

( * ) Notice: Subject to any disclaimer, the term of this patent is extended or adjusted under 35 U.S.C. 154(b) by 613 days.

(21) Appl. No.: 13/109,839

(22) Filed: May 17, 2011

(65) Prior Publication Data

US 2011/0314530 A1 Dec. 22, 2011

Related U.S. Application Data

(60) Provisional application No. 61/355,958, filed on Jun. 17, 2010.

(51) Int. Cl.
| | | |
|---|---|---|
| H04L 9/32 | (2006.01) | |
| G06F 21/32 | (2013.01) | |
| G06F 21/83 | (2013.01) | |
| H04L 29/06 | (2006.01) | |
| H04W 12/06 | (2009.01) | |

(52) U.S. Cl.
CPC .............. *H04L 9/3271* (2013.01); *G06F 21/32* (2013.01); *G06F 21/83* (2013.01); *H04L 9/3231* (2013.01); *H04L 63/0861* (2013.01); *H04W 12/06* (2013.01); *H04L 2209/805* (2013.01)

(58) Field of Classification Search
USPC ..................... 726/1–7, 16–19, 21, 35, 26–29; 713/182–186; 709/227–229; 382/115–119
See application file for complete search history.

(56) References Cited

U.S. PATENT DOCUMENTS

| | | | | |
|---|---|---|---|---|
| 5,787,187 | A * | 7/1998 | Bouchard et al. | 382/115 |
| 2005/0091338 | A1 | 4/2005 | De La Huerga | |
| 2008/0098461 | A1* | 4/2008 | Chiou et al. | 726/4 |
| 2008/0262382 | A1* | 10/2008 | Akkermans et al. | 600/559 |
| 2009/0083850 | A1 | 3/2009 | Fadell et al. | |
| 2009/0249460 | A1 | 10/2009 | Fitzgerald et al. | |
| 2010/0311390 | A9* | 12/2010 | Black et al. | 455/410 |
| 2011/0153854 | A1* | 6/2011 | Chickering | 709/229 |
| 2012/0249292 | A1* | 10/2012 | Wong et al. | 340/5.52 |

OTHER PUBLICATIONS

International Search Report and Written Opinion mailed Oct. 13, 2011 in PCT Application No. PCT/US11/40763 filed Jun. 16, 2011.
Furnell et al., "Beyond the PIN: Enhancing User Authentication for Mobile Devices," *Computer Fraud and Security*, vol. 2008, Issue 8 [Retrieved Online] Sep. 30, 2011, Retrieved from <URL: http://sciencedirect.com/science/article/pii/S1361372308701271.

* cited by examiner

*Primary Examiner* — Amir Mehrmanesh
(74) *Attorney, Agent, or Firm* — Kokka & Backus, PC (57) ABSTRACT

A system, apparatus, or method for controlling access to a network and to the associated network resources or services. The invention may be used to provide a user authentication or authorization process for a computer network, a telecommunications network, or other suitable system, apparatus, device, process, operation, etc. In some embodiments, the present invention uses a combination of device identification data (such as a device identifier or other form of token) and user-specific biometric data (such as a physical characteristic associated with the user or data generated as a result of a signal being altered by a physical characteristic of a user) to identify a user and permit the user to access the network or network resources or services.

13 Claims, 8 Drawing Sheets

SYSTEM AND METHOD FOR CONTROLLING ACCESS TO NETWORK SERVICES USING BIOMETRIC AUTHENTICATION

CROSS-REFERENCE TO RELATED APPLICATION

This application claims priority from and the benefit of provisional application No. 61/355,958, filed on Jun. 17, 2010, the full disclosure of which is incorporated herein by reference for all purposes.

BACKGROUND

Embodiments of the present invention are directed to systems, apparatuses, and methods for controlling access to network services and connected devices by requiring proof of authorization to use such systems, devices and services, and specifically, to a method and associated system and apparatus for authenticating a person desiring to access a network and its associated services and devices using a combination of device data and biometric data.

Restricting access to a network, a device, or services connected to a network is a common way of implementing a security function to prevent unauthorized use of the network or improper access to sensitive data stored within the network. The restriction or control of user access is often implemented in whole or in part by a user authentication process. In this regard, a number of authentication methods for identifying a user and authorizing a user's access to network systems and services have been developed: for example, the use of a username and password to login to a computer network, the use of a fingerprint detector to authorize access to a networked computer, or the use of an electronically-readable identification badge and access gates to authorize access to a building or area.

Some authentication or authorization systems require a degree of user involvement as part of the process. The amount of user involvement may vary between systems, from being relatively minor and unobtrusive, to being significant and placing an undesired burden on the user. For example, a username and password login requires the user to remember their username and password and to enter that data into an input device. Similarly, the use of a badge requires a user to remember to carry their badge and to proceed through a particular area or to present the badge to an access control device. Other access control systems may require a user to answer a question, or to provide some other type of information in order to authenticate themselves.

However, while effective, such systems have a number of shortcomings. These include their relative cost, complexity, level of security and availability. For example, in systems where the user needs to remember a username and password, the user may choose a relatively weak (and hence guessable) password, or if using a sufficiently strong password, may write the password down nearby to the login point, and thus potentially compromise security. Further, a relatively strong password may be more difficult for a user to remember (or may require regular changing), thus reducing its value since a password or other access control method that is difficult for a user to apply has a negative impact on the user's ability to access the system. Systems that use a badge to authorize a user can require a relatively expensive installed infrastructure (for example badge readers and gates that limit access) and are not suitable where such infrastructure cannot be installed, for example for a user logging on to a corporate network from home.

The need for user involvement in some authentication or authorization processes that are part of an access control system may also be a burden, resulting in the authentication operations being performed less frequently or with less care than would be desired for optimal security. For example, users typically log onto their computer at the start of a work session, but are not required to log on again unless the system is left unattended for a sufficient period of time. As a result, a user leaving their desk for a couple of minutes typically leaves their system unattended and insecure, during which period of time a security breach may occur.

What is desired are a system, apparatus, and method for controlling access to a network and to associated network services and network connected devices by authorizing or authenticating a user in a manner that overcomes the disadvantages of present approaches to controlling access to networks and network connected resources. It is further desired that the system, apparatus, or method for controlling access to a network and to associated network services and network connected devices be implemented in a manner that requires minimal user input, operates to reauthorize the user on a regular or ongoing basis, is capable of de-authorizing the user if they leave the proximity of the secured system, and requires minimal infrastructure or cost to implement, while maintaining a sufficiently high degree of network security. Embodiments of the present invention address these and other disadvantages of the present approaches to controlling access to networks, network services, and network connected devices both individually and collectively.

SUMMARY

Embodiments of the present invention are directed to a system, apparatus, and method for controlling access to a network and to the associated network systems, resources, services, connected devices, and functions. Embodiments of the invention may be used to provide a process or operation to identify, authenticate or authorize a user as part of providing the user with access to a computer network, a telecommunications network or another suitable system, apparatus, resource, device, process, operation, etc. In some embodiments, the present invention uses a combination of device identification data for a user device (such as a device identifier or other form of token) and user-specific biometric data (such as a physical characteristic associated with the user, or data generated as a result of an input signal being altered by a physical characteristic of a user) to identify a user and permit the user to access the network or network associated resources and services. Further, by combining detection of a device in possession of the user with the inventive authentication and authorization process, a user's previously granted access can automatically be terminated when they leave the vicinity of the network or of a network access control manager (which may be a device, or other form of access point), and a user can automatically be authenticated or authorized when they enter the vicinity of the network or network access control manager.

In one embodiment, the present invention is directed to an apparatus for providing a user with access to an access-controlled element, comprising an electronic processor programmed to execute a set of instructions, and a data storage device coupled to the processor and having the set of instructions stored therein, wherein when the set of instructions are executed by the processor, the apparatus provides the user with access by receiving data identifying a device in the possession of the user, based on the received data, verifying that the device is authorized to access the access-controlled element, and initiating a biometric authentication process to authenticate the user based on a biometric characteristic of the user, wherein the biometric authentication process further comprises providing input data for the biometric authentication process, receiving output data from a biometric transducer in response to the input data, wherein the biometric transducer is included in the device, comparing the output data to a set of expected output data, and providing the user with access if the output data is sufficiently close to the set of expected output data.

In another embodiment, the present invention is directed to a method of providing a user with access to an access-controlled element, comprising receiving data identifying a device in the possession of the user, based on the received data, verifying that the device is authorized to access the access-controlled element, and initiating a biometric authentication process to authenticate the user based on a biometric characteristic of the user, wherein the biometric authentication process further comprises providing input data for the biometric authentication process, receiving output data from a biometric transducer in response to the input data, wherein the biometric transducer is included in the device, comparing the output data to a set of expected output data, and providing the user with access if the output data is sufficiently close to the set of expected output data.

In yet another embodiment, the present invention is directed to a method of providing a user with access to an access-controlled element, comprising providing identification data for a device in the possession of the user to an access manager for the access-controlled element, in response to providing the identification data, the device receiving input data for a biometric authentication process to authenticate the user based on a biometric characteristic of the user, generating output data in response to the input data, the output data generated by a biometric transducer included in the device, and providing the output data to the access manager.

Other objects and advantages of the present invention will be apparent to one of ordinary skill in the art upon review of the detailed description of the present invention and the included figures.

DETAILED DESCRIPTION

In some embodiments, the present invention is directed to a system, apparatus, or method for controlling access to a network and to the associated network resources, network services and network connected devices. As examples, the network resources or services may include use of the network for purposes of communication or data transfer, data access, or use of devices that can be accessed over the network (e.g., communications nodes, printers, computing stations, etc.). Embodiments of the invention may be used to provide a user authentication or authorization process for a computer network, a telecommunications network or another suitable system, apparatus, device, process, operation, building, etc. In some embodiments, the present invention uses a combination of device identification data (such as a device identifier, MAC address, or other form of token) and user-specific biometric data (such as a physical characteristic associated with the user, or data generated as a result of an input signal being altered by a physical characteristic of a user) to identify a user and permit the user to access the network, network resources, network services, or network connected devices. Further, by combining detection of a device in possession of the user with the inventive authentication and authorization process, a user's previously granted access can automatically be terminated when they leave the vicinity of the network or of a network access control manager, and similarly, a user can automatically be authenticated or authorized when they enter the vicinity of the network or network access control manager.

As recognized by the inventor, a factor in determining whether an authentication system is effective relates to the amount of effort or activity a user must engage in to perform each authentication process or comply with an authentication protocol. This is partly because the more cumbersome a system is to use, the greater is the likelihood that a user may avoid using the system, or use the system in a less than secure manner. For example, a user may attempt to find insecure short-cuts to avoid using the authentication system process or to maintain a prior authentication result. Similarly, a relatively cumbersome authentication process or authentication protocol my provide more opportunities for an intruder to monitor a user's activity in order to determine the appropriate actions to perform as part of an authentication process. For example, the more often a user has to type a password or enter a PIN number (or similar form of verification), the more occasions there are for someone to watch them do so, and thereby compromise security. In addition, a relatively cumbersome authentication process or system will have a correspondingly greater impact on user productivity (as the time required to perform an authentication reduces time that could be spent by the user performing productive actions) and may generate resentment on the part of a user towards using the authentication system, resulting in an overall decline in security.

In some embodiments, the present invention may be used in conjunction with one or more standard communication protocols that operate to permit communications and the exchange of data between one device and another. As one example, a number of systems that require authentication or authorization of a user as part of controlling access contain, or have access to, communications systems that utilize the Bluetooth protocol. For example, personal computers (PCs) operating as part of a network may have Bluetooth radios built in, or can have the capability for Bluetooth networking added by the addition of an accessory such as a USB dongle. In addition, a number of devices that users regularly carry with them or have on their person include Bluetooth communications capability. For example, a large number of cell phones are Bluetooth enabled, and Bluetooth headsets are commonly carried by users.

Thus, in some embodiments, the present invention provides an authentication system and method that may be used in conjunction with a wireless portable device that is expected to be in possession of a user. Further, in some embodiments, the present invention provides an authentication system and method that operates to authenticate a user without the need for significant user interaction, such as by relying on passive authentication of a user through the acquisition and processing of biometric data acquired by a wireless portable device that is expected to be in possession of a user (where such data may be acquired without the need for conscious or active user behavior or actions that would otherwise interrupt a user in the performance of their tasks).

In some embodiments, an implementation of the present invention may include the following elements:

(1) a personal user device (e.g., a Bluetooth enabled headset or mobile phone) carried by or otherwise associated with a user, where the device may include or be capable of interacting with:

(a) a wireless communication element, capable of communicating and/or exchanging data with a communication peer, preferably using a secure encrypted channel (such as in accordance with a specified protocol, e.g., Bluetooth);

(b) an identification element, capable of providing an identification token or other form of identifying data (e.g., a manufacturer provided serial number, MAC address, etc.) for the personal user device to a peer device using the wireless communication element; and (c) a biometric transduction element, capable of producing an output (e.g., a signal, audio, data string, etc.) at least partially as a result of the detection or measurement of some physical feature or action of the user of the personal user device, and in some embodiments, in response to the input of data or a signal (e.g., a data string, signal, audio, command, etc.) provided by an access management element; and (2) an access management element (which is in addition to any networks, devices, apparatuses, systems, resources, databases, processes, operations, or services to which access is desired by a user and for which they seek authorization), and which may include or be capable of interacting with:

(a) a wireless communication element capable of communicating and/or exchanging data with the wireless communication element associated with the personal user device, preferably using a secure encrypted channel (such as in accordance with a specified protocol, e.g., Bluetooth);

(b) an authentication element capable of determining what type or level of access to networks, systems, devices, resources, data, processes, operations, services, etc. should be provided to a user (via the personal user device) on the basis of (1) an identification token (or other form of identifying data) provided by the personal user device and (2) biometrically-derived data characterizing a user which is provided (at least in part) by the biometric transduction element of the personal user device; and (c) an access control element capable of providing the user access to, or denying access to, networks, systems, devices, resources, data, processes, operations, services, etc. based on the output of the authentication element.

It should be understood that the networks, devices, apparatuses, systems, resources, data, processes, operations, services, etc. to which access is allowed or denied using an embodiment of the present invention are not restricted to those which rely on the personal user device as part of their operation. For example, in the use case where the personal user device is a Bluetooth headset, the present invention may provide a mechanism to allow the Bluetooth headset to be used to log a user into a network and to access that network via a computer or other device attached to the network. In such instances, the Bluetooth headset is acting as part of the authentication protocol for the user on the network, but may not itself be used to access the data on the network or be utilized to access other resources or features via the network. Alternatively, in the case where a Bluetooth headset is used to log a user into a telephony network (e.g., a voice over IP (VoIP) communications network), it may provide a means for accessing the telephony network, such as by enabling calls to be made and received on the Bluetooth headset via the telephony network.

Figure 1:
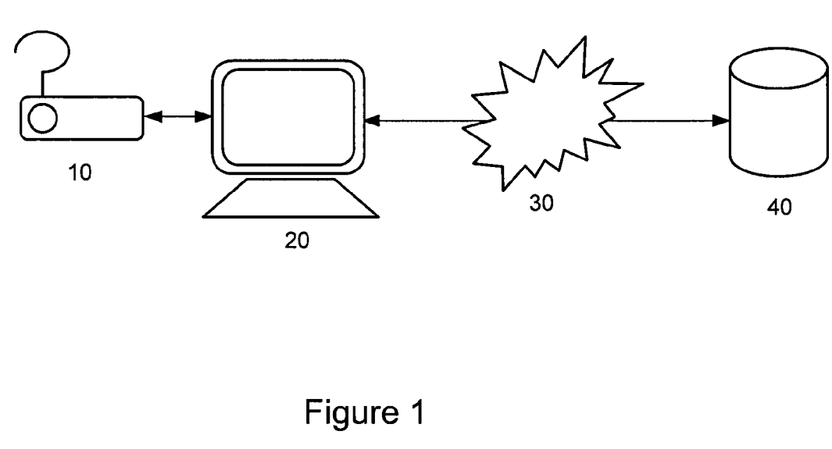
FIG. 1 is a functional block diagram illustrating certain components of a system or use case in which an embodiment of the present invention may be used to control access to a network, network resources, network services, or network connected devices.

FIG. 1 is a functional block diagram illustrating certain components of a system or use case in which an embodiment of the present invention may be used to control access to a network, network services, or network connected devices. In the example embodiment shown in the figure, a suitable personal user device commonly carried by a user, namely a Bluetooth headset 10, communicates with a personal computer 20 attached to a network 30 and capable of accessing network services 40. It should be understood that there are many situations wherein a user of a personal computer attached to a network requires authentication before they can access a network service or be permitted to utilize the connected computer. For example, in an enterprise environment, each user must typically login to the network (typically using their personal computer, although a work station or other device may also be used) to prove they are allowed to access the network and to enable personalized configurations for the personal computer. As recognized by the inventor, a user desiring access to a network (or to services, data, resources, devices, etc. accessible via the network) may commonly carry a Bluetooth headset with them, so that they are able to make and receive telephone calls more easily. Further, a user leaving their desk or another area is likely to take their Bluetooth headset with them, and such a device will therefore be closely identified with the presence of the user. Because of this likelihood of the user having a headset (or another personal device) in their possession, the inventor recognized the possibility of using the headset as part of an authentication process, since the headset would be capable of accessing information characterizing the person in possession of the headset.

Figure 2:
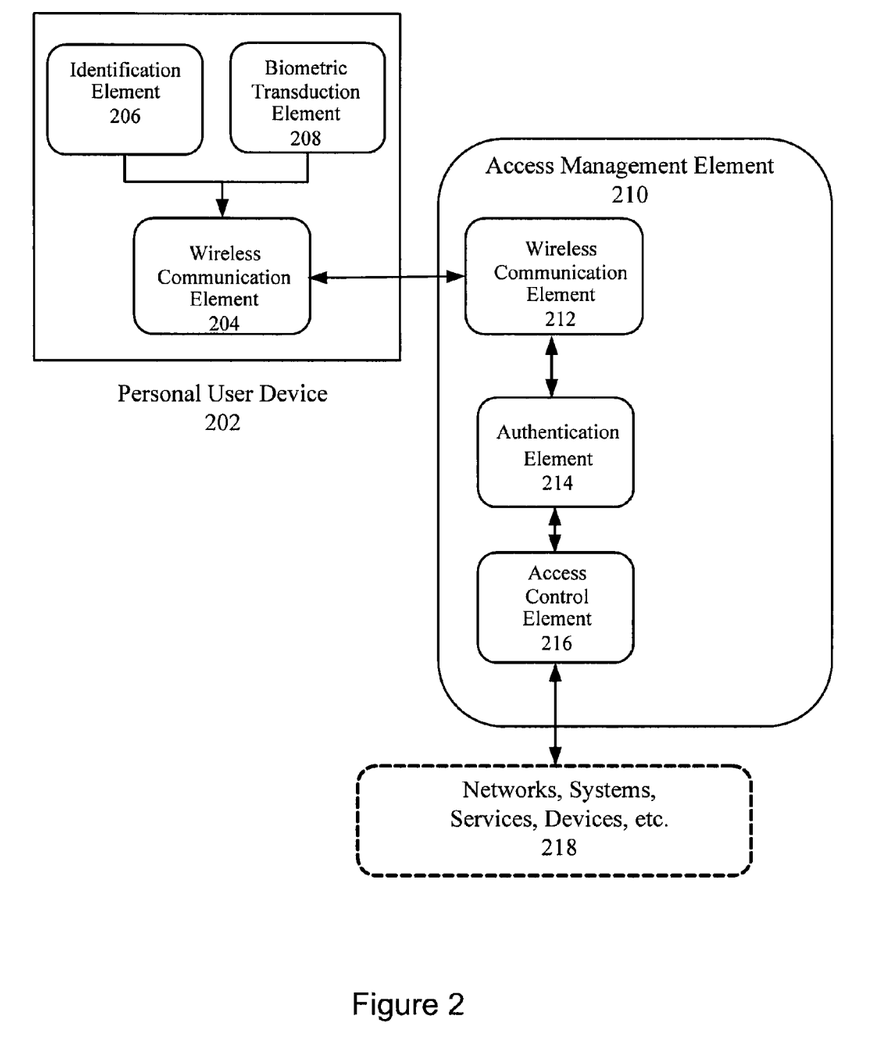
FIG. 2 is a functional block diagram illustrating the primary components of an embodiment of the present invention.

FIG. 2 is a functional block diagram illustrating the primary components of an embodiment of the present invention. A personal user device 202 (in the example described with reference to FIG. 1, this would be the Bluetooth headset) includes (or is capable of interacting with separate elements that function as) a wireless communication element 204, an identification element 206 and a biometric transduction element 208. Note that a wide variety of personal user devices 202 are possible, including for example cell phones, pagers, mono and stereo headsets, eye-glasses, wrist-watches, pendants, key-fobs, bracelets and the like. Note that an aspect of such a personal user device is that is it likely to be carried with the user as they go about their everyday activities, including being in the vicinity of, or leaving the vicinity of a network access control manager (e.g., an access point or device).

Personal user device 202 communicates with access management element 210, which includes (or is capable of interacting with separate elements that function as) a wireless communication element 212, authentication element 214, and an access control element 216. Personal user device wireless communication element 204 is capable of exchanging data with wireless communication element 212 of (or associated with) access management element 210.

The wireless communication element(s) might, for example, be an implementation of the Bluetooth wireless networking technology, the 802.11 "WiFi" standard, or another wireless technology.

Personal user device identification element 206 operates to uniquely identify personal user device 202, for example by participating in the exchange of an identification token (such as a unique identification code, data string, serial number, MAC address, etc.). Note that user device identification element 206 may also (or instead) operate as part of an authentication process by participating in an encryption key exchange operation. In some embodiments, the value of the identification token is unique to each personal user device, and typically remains consistent over time for a given personal user device being used with a given access management element (and hence with a given network or set of network services or connected devices). In general, it is desirable that the form or type of identification token be selected so that it is difficult to mimic, spoof or otherwise fake the identification token. As will be understood, one benefit of the present invention is to make spoofing of an identification token ineffective as a means of evading security or access control measures.

In some instances, identification element 206 may be part of wireless communication element 204. For example, in the case where the wireless communication element operates based on an implementation of the Bluetooth protocol, the identification element could be implemented as part of a process to exchange the Bluetooth address during an inquiry, as defined within the Bluetooth specification (where the identification token would be the Bluetooth hardware address); or, the identification element could be implemented through the use of a pre-shared link-key or other form of security data, as also defined within the Bluetooth specification. In the case where the wireless communication element operates based on an implementation of the 802.11 standard, the identification token could be the MAC address, with the identification element operating in accordance with the method of exchanging MAC addresses that is defined within the 802.11 standard.

Note that implementations of the invention are also possible where the identification element does not form part of the wireless communication element. For example, a microprocessor or data storage (e.g., memory) element within a personal user device might contain a unique (and in some cases encoded) identifier that is provided to a communication element for exchange with an access management element. Alternatively, a security module might be used to store and provide access to a unique identifier that is provided to a communication element for exchange with an access management element.

Biometric transduction element 208 associated with (e.g., part of, or capable of operation with) personal user device 202 operates to produce output data (e.g., a data string, audio signal, other form of signal, etc.) in response to detection or measurement of some bodily characteristic, movement, feature or action of the user of the personal user device, and/or in response to an input such as a data string, data sample, acoustic signal, request for user response, command, activation code, etc. A variety of biometric transduction elements are possible and may be used in implementing embodiments of the present invention. Some exemplary biometric transduction elements and their use are described in more detail in the Table below, with the understanding that other such elements may also be used in embodiments of the present invention:

| Biometric Property/ Data | Example Input | User Bodily Feature or Action | Transducer (transduction element(s)) | Example Output |
|---|---|---|---|---|
| Voice analysis | None | The user speaks their own name | Microphone | An audio recording of the user speaking their own name |
| Voice analysis | An audio recording of a sequence of words or numbers | The user speaks the words or numbers | Speaker + Microphone | The audio recording of the spoken words or numbers, or a voice print (the audio recording analyzed and reduced to a pattern representative of the voice of the user) |
| Fingerprint | None | The user moves a finger over a camera or similar sensor so that their fingerprint can be determined | Camera or other sensor | An image of the finger giving the fingerprint, or output of an analysis of the fingerprint image (given control points that reduce the full image) |
| Ear pinna | An audio recording, for example low-amplitude colored noise | The audio recording is played from a known position at the ear. Reflections of the sound off the pinnae of the ear are detected | Speaker + microphone | The audio recording as received by the microphone, modified by the particular pinna shape of the user |

-continued

| Biometric Property/ Data | Example Input | User Bodily Feature or Action | Transducer (transduction element(s)) | Example Output |
|---|---|---|---|---|
| Ear canal | An audio recording, for example low-amplitude colored noise | The audio recording is played from a known position at the ear. Reflections of the sound within the ear canal are measured | Speaker + microphone | The audio recording as received by the microphone, modified by the acoustic properties of the ear canal |
| Gait | None | The user walks. The particular pattern of their movement (gait) is used to identify them | Accelerometer | The accelerometer data that comes from their movement, in particular their gait |
| Eye movement | None | The pattern of eye movements (e.g., the rate of acceleration or deceleration during saccades and the frequency of micro saccades) | Electro-oculogram (EOG) | The electrical signals recorded by the EOG, or alternatively a metric based on them such as the rate of acceleration or deceleration |

Access management element 210 operates to authorize the user and user device to access networks, systems, services, resources, data, devices, etc. Wireless communication element 212 that is part of (or associated with) access management element 210 operates to communicate with the personal user device wireless communication element 204, and may be compatible with it with regards to the communications protocol and/or other communications aspects being utilized. For example, if personal user device wireless communication element 204 includes a Bluetooth radio, then wireless communications element 212 may also utilize a Bluetooth radio.

In some embodiments, authentication element 214 may perform the following functions:

(1) Initiate an authentication operation in association with the personal user device biometric transduction element 208, for example by providing input data (e.g., an input signal or activation code) to be used as part of the biometric transduction (and hence user identification) process; and (2) Compare the output data or response provided by biometric transduction element 208 with the output that would be expected from the authorized user of the particular user device, to determine whether the current user of the device is the authorized user.

Authentication element 214 may be implemented in any suitable form, for example as software code or a set of instructions executed by a suitably programmed microcontroller (for example an ARM microprocessor) or a suitably programmed digital signal processor.

Authentication element 214 communicates with access control element 216. If authentication element 214 determines that the appropriate user (i.e., the user authorized to access the network, systems, resources, data, services, devices, etc.) is providing the authentication data, then access control element 216 operates to enable that user to have access to the appropriate network, systems, resources, data, services, devices, etc. 218.

Figure 3:
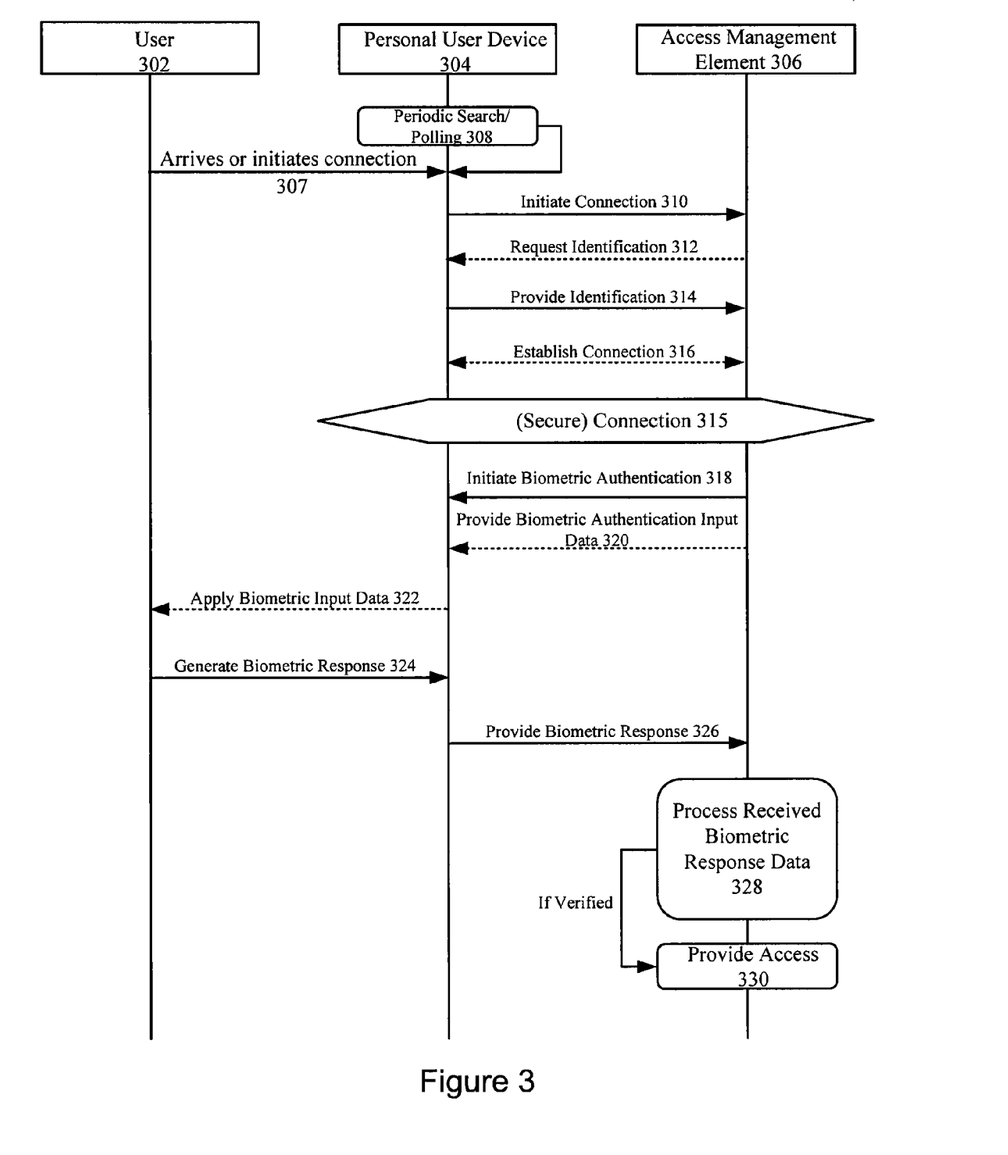
FIG. 3 is a flowchart or flow diagram illustrating a sequence of events by which a user can obtain access to a network, network resources, network services, or network connected devices in accordance with some embodiments of the present invention.

FIG. 3 is a flowchart or flow diagram illustrating a sequence of events by which a user can obtain access to a network, network services, or network connected devices in accordance with some embodiments of the present invention. As an example of a scenario (or use case) in which the present invention may be used, consider the situation where an employee/user arrives at work and desires access to an enterprise network. This may be for purposes of using email and telephony services, file server access, or accessing another type of resource or service using the network. FIG. 3 illustrates an example sequence of events by which a user (and a properly authenticated user device) may gain access to the access-controlled network, and to the services, resources, data, and devices, etc. that may be accessible over the network.

Initially, the user device (identified as "personal user device 304" in the figure) is not connected to the enterprise network (and hence unable to access the network connected services, devices, etc.), and is not within presence of the access-managed system (i.e., sufficiently close to be detected and/or recognized by an access control manager or similar element in order to initiate a process to authenticate a user and thereby provide access). As user 302 approaches the access-managed system (depicted as stage 307 in the figure), in some embodiments, user device 304 may attempt to connect to the access-managed network/system by interaction with access management element 306 (which in some embodiments, corresponds to element 210 of FIG. 2). The initiation of such a connection attempt (or as in this case, an attempt to obtain access to the network) may be the result of a user action, or alternatively, may be the result of a process implemented by the user device and/or by the access-managed network/system (such as monitoring the environment or searching for a possible connection using a polling operation, broadcasting a request, etc. as depicted at stage 308 in the figure). For example, user device 304 may regularly perform a Bluetooth inquiry, and initiate a connection attempt when an appropriate new access-managed system is identified, or alternatively the user may press a button to initiate the inquiry.

The wireless communication elements of the personal user device (as depicted by element 204 of FIG. 2) and of the access management element 306 (as depicted by element 212 of FIG. 2) initiate an operation to establish a communications connection or channel (as depicted by stage 310 of the figure), typically according to the normal mechanisms or protocols of the wireless communication elements. For example, in the case where the wireless communication elements use a Bluetooth protocol, a Bluetooth connection establishment process is initiated (i.e., the personal user device pages the access management element, which responds as defined in the Bluetooth specification).

As part of, or subsequent to, the connection establishment process, personal user device 304 provides identification data (stage 314) to access management element 306. This may be in response to a request for the identification data 312 provided by access management element 306. For example, in the case where the wireless communications elements use a Bluetooth protocol, and the identification data is the Bluetooth hardware address or a pre-shared link key, the identification data will typically be presented as part of the normal Bluetooth connection establishment process (e.g., as defined by the Bluetooth specification). In other cases, for example where a proprietary wireless communication protocol is used that does not use a hardware address identifier and the identification data is provided using a security module, additional steps may be required. For example, access management element 306 may provide a challenge to personal user device 304 (e.g., where a challenge may be a large integer) and personal user device 304 may return an appropriate answer (known as the response and being, for example, another large integer that requires particular secret knowledge to produce from the challenge, thereby identifying the user device).

After exchange and verification of the device identification data, the communication channel or connection is established (stage 316). Preferably, the communication channel or connection 315 resulting from the connection attempt and completion (and where applicable, the exchange of the identification information) is secure, for example being encrypted with a suitable session key. For example, if the wireless communications elements use a Bluetooth protocol, then an encrypted link generated according to the Bluetooth specification could be used. Use of such encryption may improve the overall security of the communications and data transfer between user device 304 and the access controlled network/system. At this point access management element 306 has established a (preferably secure) connection to a personal user device that has been authenticated as being a device that is entitled to access the network/system (and that may previously have been authorized to access the network/system).

However, as recognized by the present inventor, at this point there is not any reliable evidence that the user of the device is an authorized user. Although the device itself has been identified and authenticated, there is no confirmation that the person in possession of the device is the one who is authorized to access the network/system (e.g., as a result of being the person to whom the device was issued or whose personal device has been registered and approved to be used to access the network/system). As recognized by the present inventor, in the case of personal user devices such as cell phones and Bluetooth headsets (as well as other devices) that can easily be moved or exchanged between different users, authentication of the user is an important factor in maintaining a secure system. The lack of such user authentication creates a security weakness and may permit a breach to occur that would permit an unauthorized person to access the network/system (e.g., where an unauthorized person uses the personal user device of an authorized person to obtain access to the network/system).

In some embodiments of the present invention, in order to securely determine that a user of a device is a person authorized to access a network, system, services, devices, data, etc., access management element 306 initiates a biometric authentication process 318. In some embodiments, biometric authentication process 318 may involve measurement or determination of a biometric property, characteristic, feature or action of the user of the device. Initiation of biometric authentication process 318 (or a similar function, operation, etc.) may be accomplished by any suitable method. This may include, but is not limited to, sending an appropriate command, activation code, or data to the personal user device to initiate the authentication process, and in some cases, to provide the device with input data or a signal (320) needed to implement the authentication process. For example, the biometric authentication process may be initiated by sending a data packet, command, or control signal which the personal user device interprets as an instruction to execute some form of biometric measurement or user identification process. Further, the data, command, or signal used to initiate the biometric authentication process may include (or be in addition to) data 320 used to implement or execute the biometric authentication process. Such data 320 may include input data used to initiate a measurement of the response of a person's ear (such as the ear canal or ear pinna, as described with reference to Table 1) to that input, or data (such as a sequence of words or numbers) to be spoken by a user as part of obtaining an analysis of the user's voice. To improve security, in some embodiments, the initiation operation and/or input data for the biometric authentication process may include data that changes from one authentication attempt to another, with this data generated in a random or pseudo-random manner.

The input data 320 provided by access management element 306 will typically vary depending on the biometric transduction element or process employed (and hence the biometric characteristic of the user being measured), and will be appropriate for the operation of the biometric transduction element or process. For example, in the case where the biometric transduction element is a voice-print analyzer, the input/initiation data might include a 5-digit sequence of digits, with such a sequence being randomly or pseudo-randomly generated. In the case where the biometric transduction element operates to perform a measurement of the acoustic properties of a user's ear canal, the input data might be randomly generated white noise modulated by a noise-coloring equalization filter with randomly generated equalization coefficients. Note that other types of biometric transducers and input/initiation data are possible (including, but not limited to those described with reference to Table 1), and fall within the concepts underlying the present invention.

Upon receipt of the biometric input data, the biometric transduction element associated with personal user device 304 may apply the input data 322 to generate/determine the user's biometric response 324, and hence to provide a measurement of the appropriate biometric characteristic of the user. The process by which biometric response 324 is generated depends on the biometric transduction element and the user characteristic being measured, and is discussed further for some example biometric transductions elements and biometric authentication processes.

As noted, the biometric transduction element associated with personal user device 304 provides response or output data (depicted at stage 324 of the figure), which is a property of both the biometric feature, characteristic, property or activity of the user and the input data (if any). For example, a voice-based biometric transduction element might produce an audio recording of the user saying the 5-digit sequence that was provided as input data. Personal user device 304 provides this output or response data to access management element 306 as a response sent using the wireless communication element and in accordance with the relevant protocol (as depicted by stage 326 in the figure).

Upon receipt of the biometric transducer output or response data, the authentication element (element 214 of access management element 210 in FIG. 2) processes (e.g., compares with pre-stored data or otherwise analyzes) the response (as depicted by stage 328). This processing is performed to determine whether the response data matches the response (i.e., it is close enough within a specified tolerance or threshold) that would be received if the correctly authorized user had generated the response (e.g., if the authorized user's ear had generated the received output data in response to the provided input signal).

For example, in the case where the biometric transduction element provides a voice output or other form of audio signal, the authentication element of the access management element might perform the following operations:

(a) determine using speech recognition techniques whether the digits being spoken were the digits that were provided as the input digits (i.e., verify that the output data is the correct or expected data based on the input data); and (b) determine using a speech analysis technique or other form of signal processing whether the speaker's voice matches or is sufficiently close to that of the authorized speaker (i.e., the user of the personal user device who is authorized to access the network/system).

If authentication element 214 of access management element 210 determines that the received biometric authentication data was generated by the authorized user (as represented by the "If Verified" branch of FIG. 3), it communicates this information to the access control element of the access management element (depicted as element 216 of FIG. 2). In response, access control element 216 enables the user to have access to the appropriate network, systems, services, devices, etc. 218 (as depicted by stage 330 in FIG. 3).

As described, embodiments of the present invention provide an increased level of security by performing authentication of a device being used by a user requesting access to a network/system, and additionally by providing data relating to a biometric characteristic of the user in order to determine if they are in fact an authorized user. In some embodiments, the authentication of the device may be accomplished by verifying a device identifier provided by a manufacturer of the device (e.g., a MAC address or identifying serial number). Further, in some embodiments, confirmation of the identity of the user (to verify that the user is authorized to access the network/system) may be accomplished by comparing data generated by the device (e.g., a response to an input signal that is modified by the user's ear canal, etc.) to previously acquired user identification data. Note that in this and other embodiments, the present invention operates to authenticate a user and allow access to a network/system in a mode of operation where the user does not have to take an explicit action such as pressing a key, entering a data string, etc. This makes the present invention particularly suited for use in situations in which an automated login/logoff process is desired, such as one that can be implemented without interrupting a user's other activities.

In some embodiments, the process of authorizing a user's access to a network/system may be initiated by detecting the user's personal user device in the proximity of an access control station or access control point for the network/system. This may be accomplished through use of a form of polling operation (on the part of the access control point or the user device) or other type of device detection operation. Another possible use of the present invention is to terminate or suspend a user's access to a network/system in response to detecting that the personal user device (and hence presumably the user) is no longer in the proximity of the access control station or access control point for the network/system (such as if the user leaves a region within a specified distance or orientation to an access control point or other element of a network/system). This use of the invention may provide increased security in situations in which a user is likely to leave a work station or other means of accessing the network/system, and it is desired to prevent another user from accessing the network/system without first undergoing the appropriate authentication process.

Figure 4:
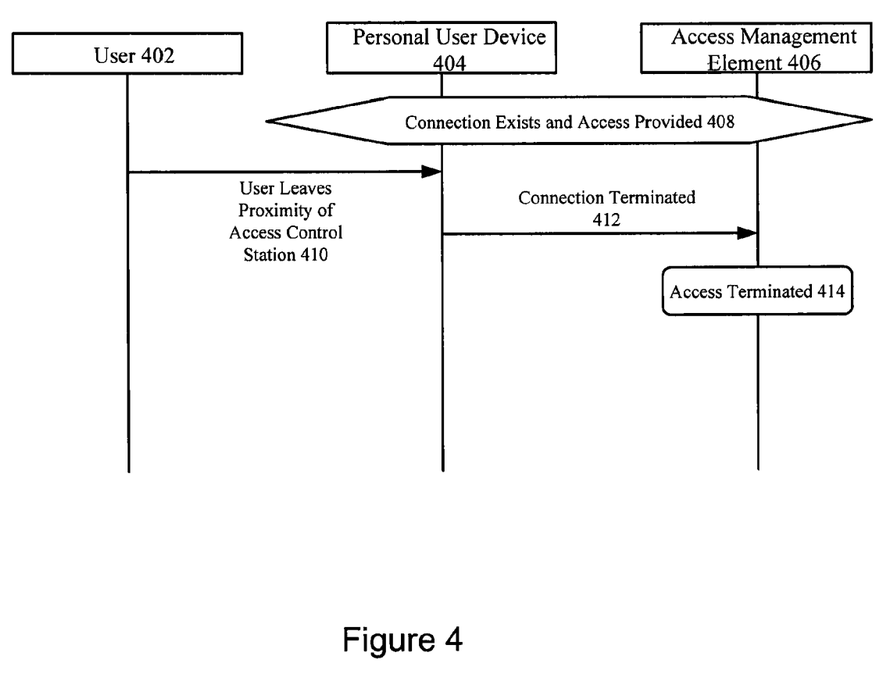
FIG. 4 is a flowchart or flow diagram illustrating a sequence of events by which a user's access to a network/system and to the associated network resources, network services or network connected devices can be terminated when the user leaves the proximity of a network access control station or access control point.

As an example of such a use of the present invention, FIG. 4 is a flowchart or flow diagram illustrating a sequence of events by which a user's access to a network/system and to the associated network resources, network services or network connected devices can be terminated when the user leaves the proximity of a network access control station or access control point. In this way the present invention may be used to improve security by automatically terminating or denying access once an authorized user is no longer in the desired proximity to an access control point for an access controlled network/system. Such a situation may arise, for example, when a user leaves the vicinity of a work station or exits an office, room, region, or building.

With reference to FIG. 4, and for purposes of example, assume that a user 402 has been provided with access to a network/system and to the associated resources, services, devices, etc. using an embodiment of the described biometric authentication process (as depicted by element 408 entitled "Connection Exists and Access Provided" in the figure). In one example use case, at some later time, the user moves away from the access controlled system (such as by leaving the vicinity of their desk or computing station, as depicted by stage 410 in the figure). At some point, the wireless communication element of the personal user device 404 will no longer be in range of (or capable of effective communication with) the wireless communication element of the access management element 406 (e.g., a strength of the wireless signal may have dropped below a predetermined threshold value). At this point, the wireless connection (i.e., the communication channel or communication capability) may automatically be terminated (as depicted by stage 412 in the figure). Access management element 406, by monitoring the status of the wireless connection, can use this change in status information to automatically terminate the user's access to the network/system and its associated resources, etc. (as depicted by stage 414), without requiring the user to log out. Such an automated access termination process increases security by logging the user out without the need for a proactive user action. This helps to ensure security of the network/system even when a user may be inattentive or in a hurry to leave the area of an access control station.

Note that in some embodiments, detection of the access controlled system by the personal user device may not require user initiation (for example, where it is achieved by means of a Bluetooth inquiry), and further, the biometric transduction process used to authenticate the user may not require explicit user action (for example, where it is through analysis of the gait of the user). In such circumstances, the user may be provided with access (or re-access) to the network or system upon their return to the proximity of the access control point or station, without explicit user action. In this situation, the present invention provides an enhanced level of security and ease of use without any increase in user actions or the placing of additional demands on the user.

Figure 5:
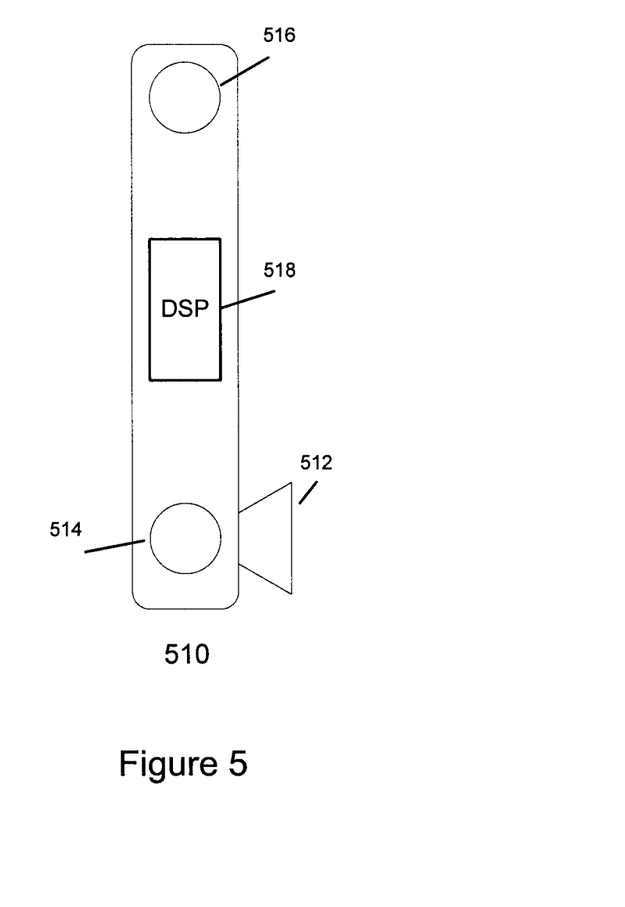
FIG. 5 illustrates a wireless personal user device, for example, a Bluetooth noise-cancelling headset, that may be used in some embodiments of the present invention.

An exemplary authentication system and method for providing a user with access to a network, system, apparatus, or network-connected elements (e.g., resources, data, devices, etc.) and that incorporates a biometric transduction element suited for use in a passive user authentication process will now be described. FIG. 5 illustrates a wireless personal user device 510, in this example a Bluetooth noise-cancelling headset, that may be used in some embodiments of the present invention. Headset 510 includes a speaker 512 (conventionally used to play incoming audio into a user's ear), a back microphone 514 and a front microphone 516 (typically used to detect the user's speech), and signal processing capability 518 (identified as the "DSP" element in the figure, and typically used to process the user's speech to reduce the transmission of environmental noise and to improve the quality of an incoming speech signal). In addition, headset 510 will typically include other elements such as a Bluetooth or other wireless transmission device, a microprocessor for handling user interface and call control, and user interface elements, such as LEDs, buttons, etc.

In the context of headset 510 or a similar device, consider the audio signal output by speaker 512 into the user's ear and the signal received by back microphone 514, in a situation where the user is not speaking and they are in an environment that is relatively quiet (i.e., lacking a source of background noise that is significant enough to prevent the described operation). In this example, the most (or in some cases, only) significant audio signal received by back microphone 514 will be an echo of the audio signal output by the speaker, reflected by a variety of surfaces, including internal surfaces of the headset, the ear canal, the pinna of the ear and possibly other surfaces of the user's body. Although these reflections may be dependent on the position of the headset in relation to the user's ear, for a given position in a given user's ear, these reflections will be approximately constant (i.e., reproducible for a given sample audio signal output by speaker 512).

Note that certain of these reflections will be dependent on the user's physiology. For example, ear canals typically have a frequency response that is 20 dB higher in the 1-2 kHz range than the 500 Hz range, but the peak frequency, the bandwidth and the gain is typically user-dependent. Ear pinna also typically have a user-dependent frequency response, depending on the size of the ear and the arrangement of the ridges of the pinna in relation to the headset's microphone.

In some senses, the ear canal may be approximated as a resonant tube, having a length that varies between about 23 mm and 29 mm (with females typically having shorter ear canals than males), and of varying shape. As would be expected, the primary resonant frequency of an ear canal will be a function of its length, and additional resonances will be a function of its shape. As a result, the ear canals of different individuals will typically have a different resonance and different frequency response (or output) for a specified input signal. Further, such different resonances will affect the extent to which different frequencies produced by the speaker are coupled into the air surrounding the speaker (as a result of the acoustic impedance of the ear canal varying with resonance), and therefore will affect the strength of a speaker signal from which an echo is derived.

As a result, for a given user wearing a headset in a consistent manner, the echo signal detected by the back microphone from the speaker output will have a frequency response that is to some extent consistent (i.e., reproducible) for that user, but different for a different user. This difference between the frequency response of the ear canal of one user from that of another user is a 'biometric' difference unique to the physiology of a given user, and which therefore may be used to identify and hence authenticate a user.

Note that while in the above example the user was not speaking and was present in a relatively quiet environment, the echo signal will similarly exist in a noisy environment, or when the user is speaking. The desired echo signal generated by the response of the user's ear canal may be recovered from the signal received by the microphone in such an environment by use of echo cancellation techniques (where the desired echo signal would typically be the difference between the actually received signal and any signal produced by an echo cancellation means). While the following description does not explicitly assume a source of environmental noise, it should be understood that the techniques discussed may be used in a noisy environment or when the user is speaking.

Figure 6:
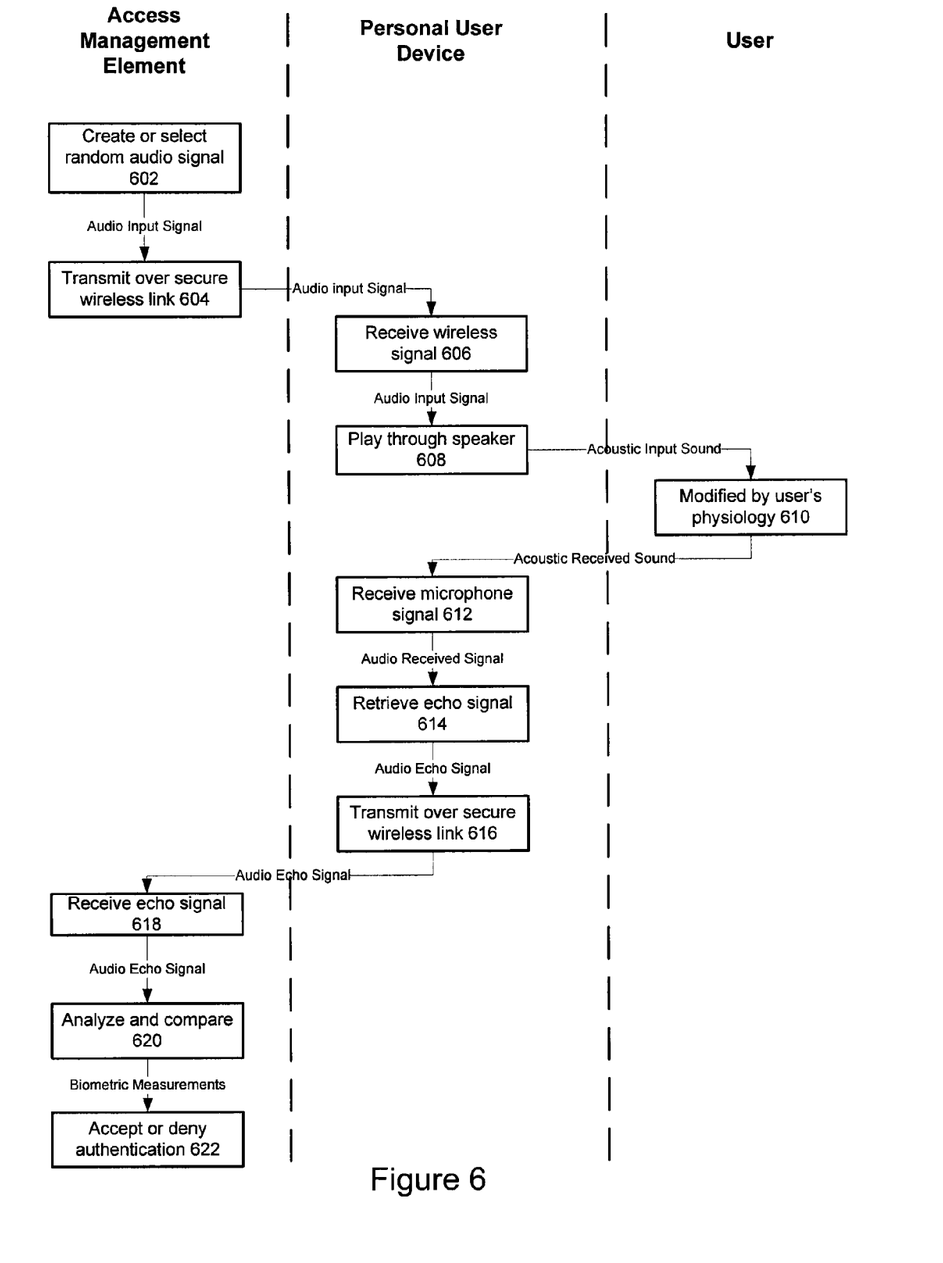
FIG. 6 is a diagram illustrating the operations that may be part of an implementation of a biometric authentication system or process in accordance with some embodiments of the present invention.

FIG. 6 is a diagram illustrating the operations that may be part of an implementation of a biometric authentication system or process in accordance with some embodiments of the present invention. Typically, the process depicted in FIG. 6 will be used in a situation in which a user desires to access a device, apparatus, system, network, or network-connected element, and first must be authenticated as being properly entitled to obtain such access. As shown in the figure, to initiate a measurement of a biometric feature of the user that will be used to authenticate the user, the access management system retrieves, selects or generates an audio signal (602). Preferably, this signal changes between different authentication operations and in that sense is random or pseudo-random. For example, the signal might be a white noise signal generated using a suitable white noise generator, such as a pseudo-random sequence generator seeded with a suitable seed (such as the time and date that the authentication operation is occurring). The signal might also be a random selection from a set of pre-recorded audio clips, or a system sound (such as the incoming speech from a phone call, an alert, notification, podcast or white noise such as that produced by a noise generator).

The access management system sends this audio signal (identified as "audio input signal" in the figure) over a wireless communications link (604) to the personal user device (e.g., a headset), which receives the signal (606) and plays the audio signal into the user's ear via a speaker (608) (thereby producing the signal identified as "acoustic input sound" in the figure). The acoustic input sound is modified by the user's ear canal (610) (and possibly other biometric properties, as suggested by "modified by user's physiology" in the figure) to form an output signal (identified as "acoustic received sound" in the figure). The acoustic received sound is detected by the personal user device's microphone (612) (e.g., the back microphone of a headset), to generate a signal that has been modulated or otherwise modified by the biometric properties of the user (identified as "audio received signal" in the figure). The personal user device may then process the received audio signal to obtain the echo signal (614) (i.e., the signal representing the operation of the user's biometric properties on the acoustic input sound and thus characterizing those properties of the user) by the use of echo cancellation techniques. Such techniques may function to subtract any non-echo signal from the received signal and thereby determine the echo or user characterization signal. The personal user device may then return the echo signal to the access management element over the wireless communications link (616) (which is preferably a secure mode of transport). The access management element then provides the signal to a suitable signal processing or analysis element that functions to determine if the echo signal represents the biometric response of a proper user, the operation of which will now be described.

As a result of the forgoing operations, the access management element has received a signal containing information characterizing the biometric response of the user in response to an input signal (618) (in some cases a randomly generated input signal). Note that preferably, the generation and transport of this biometric response data or signal occurs using a secure communications channel, and that no information concerning the biometric properties of the user is stored on the personal user device (and thereby the device itself does not contain information that could be compromised).

Note that in the above example, the signal containing information about the biometric response of the user to the applied input signal has been generated passively (i.e., the user has made no conscious action to assist with its generation and has not been inconvenienced or had their present activities interrupted). If the chosen audio input signal was at a low enough volume level and too quiet for the user to consciously detect, or was at a frequency outside of or at an edge of the human audible range, or was a system message or alert that contained additional information, then the user will not even have been aware of the authentication process being performed. Thus, in some embodiments, an audio signal being used for another purpose may also be used as part of an authentication process.

The access management element now has a signal that contains information about one or more biometric properties of the user and may process that signal (620) to determine whether or not the user is the authorized user of the personal user device and hence is entitled to access the resources under the management of the access management element (622). An example of the functioning of the signal processing or analysis element will now be described by reference to FIG. 7, which is a diagram illustrating an example input signal (FIG. 7(a)), example received signal(s) (FIG. 7(b)), and example frequency responses of users' ears (FIG. 7(c)) that may be used as part of a process to authenticate a user in accordance with some embodiments of the present invention.

Figure 7:
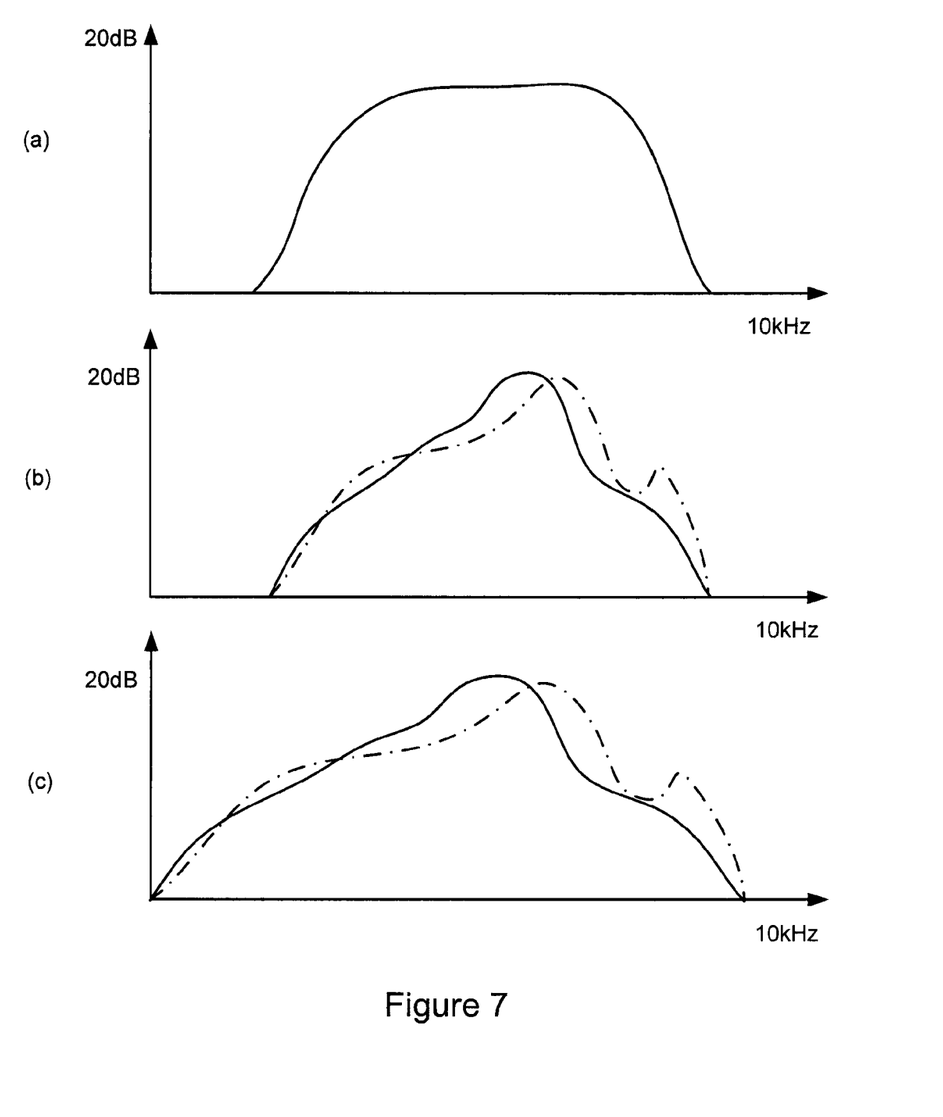
FIG. 7 is a diagram illustrating an example input signal (FIG. 7($a$)), example received signal (FIG. 7($b$)), and example frequency response of a user's ear (FIG. 7($c$)) that may be used as part of a process to authenticate a user in accordance with some embodiments of the present invention.

As an example, assume that the input signal provided by the access management element was a band-limited white-noise signal, with a spectrum as indicated in FIG. 7(a). The received signal will therefore have a spectrum that is the spectrum of the input signal as modulated by the frequency response of the user's ear and head. FIG. 7(b) illustrates example spectra of the received signal for two different illustrative users. FIG. 7(c) gives the frequency response of the user's ear and head for each of those users, where such frequency responses can be determined from the difference between the received signal and the input signal spectra.

The spectra illustrated in FIG. 7 may be generated by applying a Fourier transform to the corresponding time-domain signals, and taking the magnitude of the transformed signal, as is well known to those skilled in the art. The resulting spectra can be represented by a set of points, with such points being the magnitude of the spectrum at a given frequency (such frequencies typically being uniformly spaced from zero up to half of the sampling frequency of the time-domain signal). In this example, the task of authenticating a user of the personal user device becomes one of determining whether a set of measurements is sufficiently likely to have come from a user who has been granted access to the resources whose access is managed by the access management element.

Note that such a determination typically requires prior knowledge of what the likely values are for the set of measurements for a given user (i.e., a user who is authorized to access the resources and who has previously provided data characterizing their biometric response to a sample input signal). This may be achieved by making initial biometric response measurements whose purpose is not to authenticate but to train the authentication mechanism as to the expected value of the measurements for a given user. Such a set of training measurements may be performed in a secure environment, or when the portable device is first provided to the user, for example.

As an example, consider a situation where an authorized user has previously undergone the authentication process for the purpose of training the access management element. The access management element will have access to one or more sets of measurements, with each set being (for example) a measurement of the amplitude of the spectrum of the transfer function that represents the user's biometric response to an input signal. An expectation (the mean) and an expected deviation from the mean (the variance, or alternatively the standard deviation) may be derived for each of the corresponding points in each of the set of measurements. The training measurements may then be represented by two sets of data, the means for each of the frequencies (or frequency bins) and the standard deviations for those frequencies, with those values being stored in a suitable data storage device.

At a later time a user of the personal user device desires to access a resource using the access management element, and therefore participates in an authentication process. As described, the access management element has access to data representing the frequency response for the authorized user, and now needs to compare the measured values from a current authentication process (which may or may not have been generated by the authorized user) with the expected values (i.e., those corresponding to the authorized user and represented by the training data set(s)). Note that in some embodiments, the probability that the current user is the authorized user may be estimated by determining the probability that each measurement was from the authorized user based on the mean and the variance of the data in the training data set(s). For each frequency band, the probability that a measurement is from the authorized user may be expressed by calculations based on the normal distribution over the mean and variance for that frequency band. The results from multiple bands may be accumulated based on the assumption that they are independent.

The overall calculated probability that the current user is the authorized user may be used to determine whether to authorize access using a suitable criteria (the selection of which may depend upon the resource(s) involved, the security level for a resource, the security level for a resource for a given day and/or time, a user's tolerance to the authentication process, etc.). Example criteria include, but are not limited to, a sufficiently high probability above a chosen threshold, a probability within a specified range, etc.

Note that while in the above example the back microphone located in a Bluetooth headset was used to gather the response signal from the user's ear canal, other microphones capable of receiving an echo signal may be used. For example, a microphone may be placed to advantageously receive the echo signal, such as in a position inside the users ear, facing the pinna, etc.

Note that in some embodiments, in response to receiving data identifying the user device and/or data authenticating the user, the access management element may access data that describes the access rights of the user. In such an embodiment, those access rights may be used to determine which network services, resources, data, system features, devices, etc. that the user is permitted to utilize after they have been properly authenticated. Further, the access management element may use data identifying the user device to properly configure the user device and/or the network or system to be accessed by the user to enable optimal operation of the user device (or another form of input device) with the network or system. As an example, in response to receiving data identifying the user device, the access management element may obtain data describing one or more of: (a) the type of authentication data or process to be used to authenticate the user (which may depend upon the type of user device and its biometric transducer); (b) the access rights or privileges of a properly authenticated user; or (c) data to be used in configuring a network, system, resource, service, or device, or a data input device to be used by the user (e.g., operational parameters of an input device, system configuration parameters, etc.).

A user authentication system, apparatus and method for controlling access to a network or to network connected resources, devices, data, etc. has been described. The inventive system, apparatus and method provide an enhanced level of security over authentication methods that rely solely on the authentication of a device by incorporating both device and user identification into the authentication process. Further, the present invention provides a way to authenticate a user that in some embodiments requires little, if any, user actions and thus is suitable for use in a situation in which users may be distracted or unwilling to participate in a standard authentication process. In some embodiments, the present invention includes device identification and user identification based on a biometric characteristic of a user, with the identification operations capable of being performed in either order (i.e., device identification followed by user identification, or vice-versa). The invention can be used to verify both a particular device (e.g., to ensure that it is compatible with the network, to configure its operation, to verify that it is a device that is registered with the network, etc.) and the current user of that device (to ensure that the current user of the device is an authorized user of the network, etc.) prior to permitting the user to access a network, device, data, resource, etc. using the device.

Figure 8:
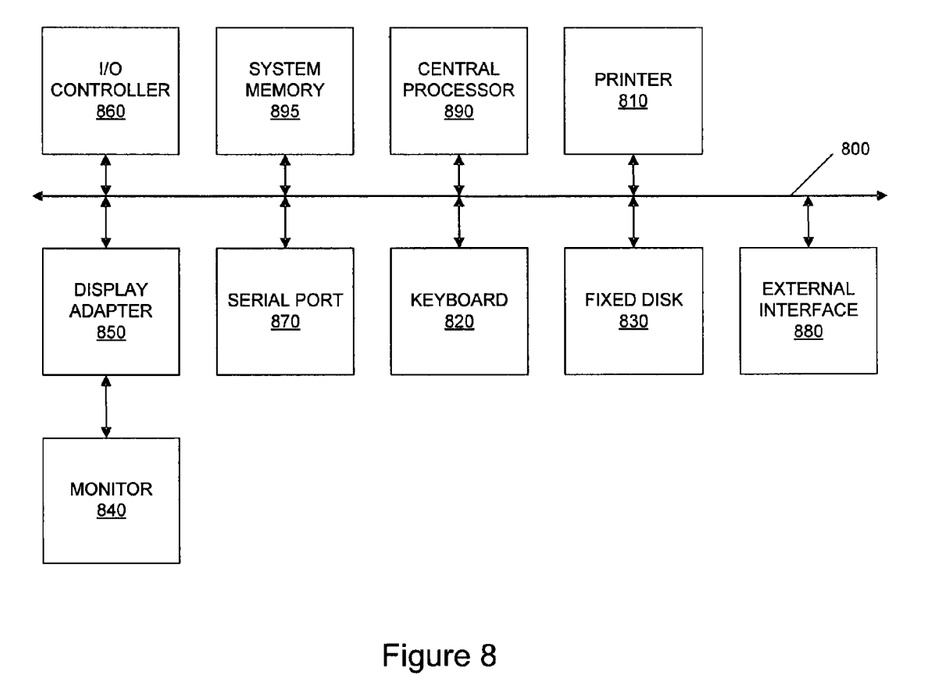
FIG. 8 is a block diagram of elements that may be present in a computing device or system configured to execute a method or process in accordance with some embodiments of the present invention.

In some embodiments, the inventive methods, processes or operations may be wholly or partially implemented in the form of a set of instructions executed by a suitably programmed central processing unit (CPU) or microprocessor. The CPU or microprocessor may be incorporated in an apparatus (such as the described personal user device and/or access management element), or other data processing device. As an example, FIG. 8 is a block diagram of elements that may be present in a computing device or system configured to execute a method or process in accordance with some embodiments of the present invention. The subsystems shown in FIG. 8 are interconnected via a system bus 800. Additional subsystems such as a printer 810, a keyboard 820, a fixed disk 830, a monitor 840, which is coupled to a display adapter 850, and others are shown and may be used (but are not required) in the apparatus. Peripherals and input/output (I/O) devices, which couple to an I/O controller 860, can be connected to the computing system by any number of means known in the art, such as a serial port 870. For example, the serial port 870 or an external interface 880 can be used to connect the computing device to a wide area network such as the Internet, a mouse input device, or a scanner. The interconnection via the system bus 800 allows a central processor 890 to communicate with each subsystem and to control the execution of instructions that may be stored in a system memory 895 or the fixed disk 830, as well as the exchange of information between subsystems. The system memory 895 and/or the fixed disk 830 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. An apparatus for providing a user with access to an access-controlled element, comprising:

an electronic processor programmed to execute a set of instructions; and a data storage device coupled to the processor and having the set of instructions stored therein, wherein when the set of instructions are executed by the processor, the apparatus provides the user with access by transmitting a request from an access management element for a device identifier via a polling operation to detect a proximity of the user;

receiving data identifying a device in the possession of the user;

based on the received data, verifying that the device is authorized to access the access-controlled element; and initiating a biometric authentication process to authenticate the user based on a biometric characteristic of a user-dependent frequency response of a pinna of an ear of the user, wherein the biometric authentication process further comprises providing over a secure encrypted channel of a wireless communication link transmitted by a wireless communication element included in an access management element, an audio recording of low amplitude colored noise based on randomly-generated filter coefficients as input data for the biometric authentication process;

changing the audio recording from one authentication attempt to another authentication attempt;

receiving over the secure encrypted channel of the wireless communication link transmitted by another wireless communication element included in the device, output data for a biometric transducer in response to the input data, wherein the biometric transducer comprises a microphone facing the pinna and the microphone is included in the device;

comparing the output data to a set of expected output data, the output data including data representing an echo signal derived from echo cancellation; and providing the user with access if the output data differs from the set of expected output data by less than a threshold amount.

2. The apparatus of claim 1, wherein the device is a headset.

3. The apparatus of claim 1, wherein the biometric transducer further comprises a speaker included in the device.

4. The apparatus of claim 1, wherein the access-controlled element is a network or an element connected to a network.

5. The apparatus of claim 1, wherein the biometric authentication process is passive and requires no additional action by the user.

6. The apparatus of claim 1, wherein the data identifying the device is an address of the device.

7. The apparatus of claim 1, wherein the input data further comprises a sequence to be spoken by the user.

8. A method of providing a user with access to an access-controlled element, comprising:
    transmitting a request from an access management element for a device identifier via a polling operation to detect a proximity of the user;
    receiving data representing the device identifier identifying a device in the possession of the user responsive to transmitting the request;
    based on the received data, verifying that the device is authorized to access the access-controlled element; and
    initiating a biometric authentication process to authenticate the user based on a biometric characteristic of a user-dependent frequency response of a pinna of an ear of the user, wherein the biometric authentication process further comprises
    providing over a secure encrypted channel of a wireless communication link transmitted by a wireless communication element included in an access management element, an audio recording of low amplitude colored noise based on randomly-generated filter coefficients as input data for the biometric authentication process;
    changing the audio recording from one authentication attempt to another authentication attempt;
    receiving over the secure encrypted channel of the wireless communication link transmitted by another wireless communication element included in the device, output data from a biometric transducer in response to the input data, wherein the biometric transducer comprises a microphone facing the pinna and the microphone is included in the device;
    comparing the output data to a set of expected output data, the output data including data representing an echo signal derived from echo cancellation; and
    providing the user with access if the output data differs from the set of expected output data by less than a threshold amount.

9. The method of claim 8, wherein the device is a headset.

10. The method of claim 8, wherein the biometric transducer further comprises a speaker included in the device.

11. The method of claim 8, wherein the access-controlled element is a network or an element connected to a network.

12. The method of claim 8, wherein the biometric authentication process is passive and requires no additional action by the user.

13. The method of claim 8, wherein the input data further comprises a sequence to be spoken by the user.

* * * * *